US012763527B2

(12) United States Patent
Wang

(10) Patent No.: US 12,763,527 B2
(45) Date of Patent: Oct. 13, 2026

(54) PLUG-IN APPARATUS FOR A VEHICLE

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 473 days.

(21) Appl. No.: 18/265,944

(22) PCT Filed: Oct. 20, 2021

(86) PCT No.: PCT/CN2021/124844

§ 371 (c)(1),
(2) Date: Jun. 7, 2023

(87) PCT Pub. No.: WO2022/134788

PCT Pub. Date: Jun. 30, 2022

(65) Prior Publication Data

US 2024/0039219 A1 Feb. 1, 2024

(30) Foreign Application Priority Data

Dec. 21, 2020 (CN) ........................ 202011522737.1

(51) Int. Cl.
*H01R 13/68* (2011.01)

(52) U.S. Cl.
CPC .................................. *H01R 13/68* (2013.01)

(58) Field of Classification Search
CPC ...... H01R 13/68; H01R 13/03; H01R 13/684; H01H 85/205; H01H 85/203; H01H 2085/208; B60R 16/0238
See application file for complete search history.

(56) References Cited

U.S. PATENT DOCUMENTS

| | | | | |
|---|---|---|---|---|
| 8,297,988 B2 * | 10/2012 | Sugiura | H01R 9/245 439/79 |
| 8,297,998 B2 | 10/2012 | Ju et al. | |
| 2003/0166352 A1 | 9/2003 | Oh | |

FOREIGN PATENT DOCUMENTS

| | | |
|---|---|---|
| CN | 2615936 Y | 5/2004 |
| CN | 201868743 U | 6/2011 |

(Continued)

OTHER PUBLICATIONS

First Office Action issued on Dec. 27, 2024 for counterpart Chinese Patent Application No. 202011522737.1.

(Continued)

*Primary Examiner* — Abdullah A Riyami
(74) *Attorney, Agent, or Firm* — Michael Fedrick; LOZA & LOZA, LLP

(57) ABSTRACT

A plug-in apparatus; comprising a wire inlet connection portion and a wire outlet connection portion is disclosed, in which a fuse is connected between a first end of the wire inlet connection portion and a first end of the wire outlet connection portion, a second end of the wire inlet connection portion is connected to a power supply wire, a second end of the wire outlet connection portion is connected to a load wire, and the second end of the wire outlet connection portion having at least one connection branch, each of which serves as a load interface. The plug-in apparatus of achieves wire diameter reduction and current-shunting of the wire while protecting the wire, realizes capacity-increasing use, and performs design supplementation. The plug-in apparatus has the advantages of having a simple structure, convenient use and high safety.

14 Claims, 9 Drawing Sheets

(56) References Cited

FOREIGN PATENT DOCUMENTS

| | | | |
|---|---|---|---|
| CN | 102452307 | A | 5/2012 |
| CN | 203084465 | U | 7/2013 |
| CN | 204258206 | U | 4/2015 |
| CN | 102856138 | B | 8/2015 |
| CN | 105914111 | A | 8/2016 |
| CN | 106711885 | A | 5/2017 |
| CN | 207241627 | U | 4/2018 |
| CN | 207458878 | U | 6/2018 |
| CN | 208299379 | U | 12/2018 |
| CN | 210925937 | U | 7/2020 |
| CN | 112582240 | A | 3/2021 |
| CN | 214254330 | U | 9/2021 |
| JP | H0566890 | U | 9/1993 |
| JP | 2003272511 | A | 9/2003 |

OTHER PUBLICATIONS

Search report issued on Dec. 27, 2024 for counterpart Chinese Patent Application No. 202011522737.1.

First Office Action issued on Feb. 13, 2025 for counterpart European Patent Application No. 21908789.7.

European Search Report for corresponding European Patent Application No. 21908789.7, Jun. 6, 2024, 11 pgs.

International Search Report for International Patent Application No. PCT/CN2021/124844, dated Jun. 30, 2022.

Second Office Action issued on Apr. 30, 2025 for counterpart European Patent Application No. 21908789.7, 7 pages.

The Second Office Action issued on May 26, 2025 for counterpart Chinese Patent Application No. 202011522737.1, along with machine EN translation downloaded from EPO, 11 pages.

Third Office Action issued on Oct. 8, 2025 for counterpart European Patent Application No. 21908789.7, 13 pages.

First Office Action issued on Oct. 24, 2025 for counterpart Vietnam Patent Application No. 1-2023-04658, along with the English translation, 4 pages.

First Office Action issued on Dec. 17, 2025 for counterpart Mexican Patent Application No. MX/a/2023/007439, along with the Machine English translation, 8 pages.

* cited by examiner

PLUG-IN APPARATUS FOR A VEHICLE

RELATED APPLICATION

This application is the U.S. national stage of International Patent Application No. PCT/CN2021/124844, filed on Oct. 20, 2021, which claims the benefit of priority to Chinese Patent Application No. 202011522737.1, entitled 'plug-in apparatus' and filed on Dec. 21, 2020, both of which are hereby incorporated by reference in their entireties.

TECHNICAL FIELD

The present disclosure relates to the technical field of automobile electrical connections, and particularly to a plug-in apparatus.

BACKGROUND

With the promotion of the trend of automatic driving and whole vehicle intelligence, the number of whole vehicle electrical devices (loads) is increasing. Each load is usually connected to an electrical system through a central power distribution box, but the capacity and wiring position of the central power distribution box are limited. When the capacity and wiring position of the central power distribution box cannot meet the requirements, since the development of the central power distribution box needs a long period of time and a high development cost, developers often have to adopt an unprotected wire diameter reduction, that is, a wire is directly connected to an electrical bus without a matched fuse. As a result, the wire is often burned directly because the current exceeds its current-carrying capacity, which has great potential safety hazards. Therefore, how to improve the safety of whole vehicle power distribution, meet the demand of the increasing loads and the whole vehicle development schedule, and reduce development costs has become an urgent technical problem to be solved.

SUMMARY

The embodiments of the present disclosure provide a plug-in apparatus, so as to solve the problem of potential safety hazards in the existing unprotected wire diameter reduction.

The embodiments of the present disclosure propose a plug-in apparatus, including a wire inlet connection portion and a wire outlet connection portion, a fuse is connected between a first end of the wire inlet connection portion and a first end of the wire outlet connection portion, a second end of the wire inlet connection portion is connected to a power supply wire, and a second end of the wire outlet connection portion is connected to a load wire, and the second end of the wire outlet connection portion has at least one connection branch, each of which serves as a load interface. The wire inlet connection portion is connected to the power supply wire, the wire outlet connection portion is connected to the load wire, the wire inlet connection portion and the wire outlet connection portion are connected through the fuse, current enters the fuse passing through the wire inlet connection portion, and is shunted from the connection branch of the wire outlet connection portion after passing through the fuse, thereby achieving the purpose of wire diameter reduction and current-shunting of the wire while protecting the wire, realizing capacity-increasing use when the capacity and the wiring position of a central power distribution box cannot meet requirements, and performing design supplementation in cooperation when the load configuration of the whole vehicle increases. It has the advantages of simple structure, convenient use and high safety, and has a lower cost compared with the capacity-increasing of the power distribution box, thereby solving the problem of potential safety hazards in the existing unprotected wire diameter reduction mode. When there is one connection branch, under the protection of the fuse, the wire diameter of the load wire can be smaller than that of the power supply wire, thereby achieving the purpose of wire diameter reduction.

According to an aspect of the embodiments of the present disclosure, at least one connection terminal is further included, to which the second end of the wire inlet connection portion and/or the at least one connection branch is connected, and the connection terminal is connected to an external wire. The connection between the power supply wire and the wire inlet connection portion, and the connection between the load wire and the connection branch are realized through the connection terminal, so that the connections are convenient and neat to facilitate the planning of the electrical circuit.

According to an aspect of the embodiments of the present disclosure, a plug-in portion is further included, which is provided with at least one plug-in through-hole penetrating from a first end to a second end thereof; one end of the connection terminal is connected to the second end of the wire inlet connection portion or the connection branch, the other end of the connection terminal extends into the plug-in through-hole from one end of the plug-in through-hole, and the other end of the plug-in through-hole is connected to the external wire. The connection terminal extends into the plug-in through-hole, and the power supply wire could also extend into the plug-in through-hole, so as to be connected to the connection terminal and then be connected to the wire inlet connection portion. Similarly, the load wire may extend into the plug-in through-hole, so as to be connected to the connection terminal and then be connected to the connection branch. By disposing the plug-in portion with the plug-in through-hole, it is convenient for the load wire to be connected to the circuit of the whole vehicle, thereby avoiding excessive external welding spots and achieving the purpose of cost saving. Meanwhile, there may be a plurality of plug-in through-holes in one-to-one correspondence with a plurality of connection terminals, so that the connection of each connection terminal is also convenient and the wiring position is more flexible.

According to an aspect of the embodiments of the present disclosure, a positioning plate is further included, on which the at least one connection terminal is disposed to penetrate therethrough, so that two ends of the connection terminal are located at two sides of the positioning plate, respectively; the wire inlet connection portion and the wire outlet connection portion are both located at a first side of the positioning plate, and one end of the connection terminal located at the first side of the positioning plate is connected to the wire inlet connection portion or the wire outlet connection portion; the plug-in portion is located at a second side of the positioning plate, and one end of the connection terminal located at the second side of the positioning plate extends into the plug-in through-hole. The connection terminal penetrates the positioning plate, one end of the connection terminal is connected to the wire inlet connection portion and the wire outlet connection portion located at one side of the positioning plate, the other end of the connection terminal is connected to the plug-in portion located at the other side of the positioning plate, and the connection terminal is positioned by the positioning plate. Thus, a plurality of connection terminals are arranged in rows through the positioning plate, so that the relative positions of the connection terminals are stable, which facilitates the wire connection, makes the connected wires more stable, and also facilitates the overall assembly of the plurality of connection terminals.

According to an aspect of the embodiments of the present disclosure, a positioning plate is further included, on which the at least one connection terminal is disposed and laid flat on a side of the positioning plate from a first end to a second end thereof; the wire inlet connection portion and the wire outlet connection portion are close to the first end of the positioning plate, and one end of the connection terminal close to the first end of the positioning plate is connected to the wire inlet connection portion or the wire outlet connection portion; the plug-in portion is close to the second end of the positioning plate, and one end of the connection terminal close to a second side of the positioning plate extends into the plug-in through-hole. The connection terminals are laid flat on a side of the positioning board, and may be fabricated in the form of a Printed Circuit Board (PCB), which achieves a high integration, occupies a small space, and facilitates the wire connection.

According to an aspect of the embodiments of the present disclosure, a housing is further included, in which the positioning plate, the wire inlet connection portion and the wire outlet connection portion are disposed, and the plug-in portion is detachably connected to the housing from one side of the housing. The positioning plate is disposed in the housing means that the connection terminals are disposed in the housing. By being disposed in the housing, the wire inlet connection portion, the wire outlet connection portion and the connection terminal are convenient to be connected to other apparatus by the housing, such as being fixed on the vehicle body, while being protected, thereby ensuring that the structure and the connection relationship are stable. The detachable connection between the plug-in portion and the housing facilitates the connection and fixation of the power supply wire and the load wire with the connection terminals.

According to an aspect of the embodiments of the present disclosure, sockets are provided on a top of the housing at positions corresponding to the first end of the wire inlet connection portion and the first end of the wire outlet connection portion, and the sockets are configured to fix the fuse. The fuse extends into the housing from the socket and is connected to the wire inlet connection portion and the wire outlet connection portion, which facilitates the connection and replacement of the fuse, and the socket can fix the fuse connected, so that the position of the fuse is more stable. The socket is located at the top of the housing, which is convenient for observing the specification and the connection state of the fuse, and is also convenient for the connection and specification adjustment of the fuse.

According to an aspect of the embodiments of the present disclosure, an outer wall of the housing is provided with at least one positioning hanger. The arrangement of the positioning hanger facilitates the mounting of the housing, and there may be two positioning hangers located at two sides of the housing, respectively, so that the mounting of the housing is more convenient and the position after mounting is more stable.

According to an aspect of the embodiments of the present disclosure, each of the first end of the wire inlet connection portion and the first end of the wire outlet connection portion is provided with a connector which is connected to the fuse. The end of the fuse is connected to the connector to realize the connection between the fuse, and the wire inlet connection portion and the wire outlet connection portion, and the connection is quick and reliable.

According to an aspect of the embodiments of the present disclosure, the wire inlet connection portion and the wire outlet connection portion are disposed in at least one pair, and the position between the wire inlet connection portions and the wire outlet connection portions of each pair is connected to the fuse. One pair of the wire inlet connection portion and the wire outlet connection portion may be connected to a plurality of loads by one fuse, and a plurality of pairs of the wire inlet connection portions and the wire outlet connection portions are multiple fuses, which can be connected to more loads; grouped connections may be made according to the types and specifications of the loads; loads of the same type, such as a plurality of lamps, may be connected to one pair of the wire inlet connection portion and the wire outlet connection portion, and loads of similar specifications, such as loads with similar rated currents, may be connected to one pair of the wire inlet connection portion and the wire outlet connection portion, so that the connection of the loads and the current distribution are more reasonable, while facilitating matching of fuse specifications and realizing more accurate protection. For example, when loads with similar and low rated currents are grouped and connected to one pair of the wire inlet connection portion and the wire outlet connection portion, fuses also having low rated currents may be matched so as to protect all of the loads in the group.

According to an aspect of the embodiments of the present disclosure, at least part of surfaces of the wire inlet connection portion and the wire outlet connection portion are provided with plating layers; a thickness of a plating layer in an area for connecting the fuse on each of the wire inlet connection portion and the wire outlet connection portion is greater than or equal to that of a plating layer outside the area.

According to an aspect of the embodiments of the present disclosure, a material of the plating layer is one or alloy or combinations of nickel, cadmium, zirconium, chromium, cobalt, manganese, aluminum, tin, titanium, zinc, copper, silver, gold, graphene and carbon-based compound.

According to an aspect of the embodiments of the present disclosure, a thickness of the plating layer is 0.09 μm to 1,500 μm.

According to an aspect of the embodiments of the present disclosure, the fuse is one or more of a hot-melt fuse, a thermistor fuse, a positive temperature coefficient resistor fuse, a memory alloy fuse, a thermal trigger electronic fuse and a current trigger electronic fuse.

According to an aspect of the embodiments of the present disclosure, a current carrying capacity of the power supply wire connected to the second end of the wire inlet connection portion is greater than or equal to that of the load wire connected to the second end of the wire outlet connection portion.

According to an aspect of the embodiments of the present disclosure, the socket is connected to a cover, and at least one sealing member sleeves on the cover, and the sealing member is located between the cover and the housing.

BRIEF DESCRIPTION OF THE DRAWINGS

In order to more clearly explain the technical solutions of the embodiments of the present disclosure, the drawings to be used in the description of the embodiments of the present disclosure will be briefly introduced as follows. Obviously, the drawings used in the following description only illustrate some embodiments of the present disclosure, and those of ordinary skill in the art can obtain other drawings from them without any creative effort.

In the drawings.

Figure 1:
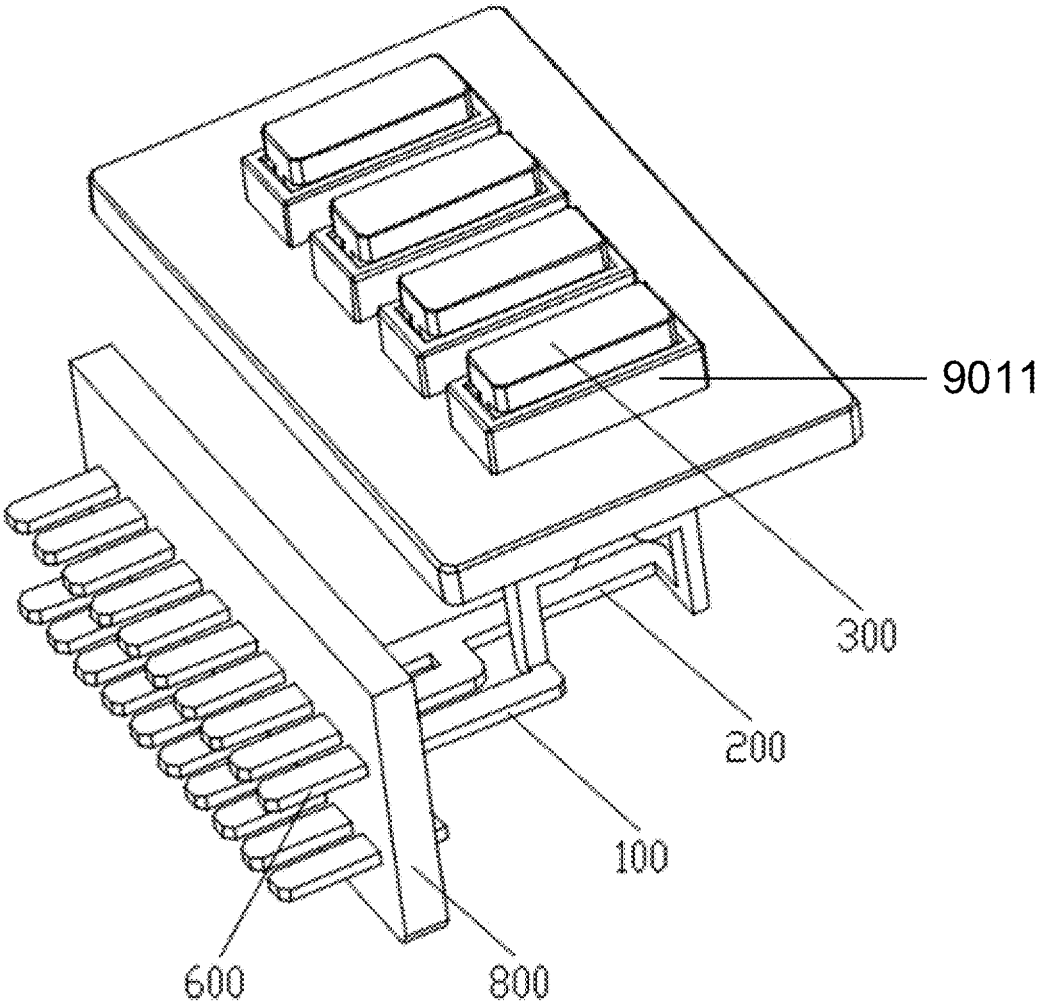
FIG. 1 illustrates a partial structure schematic diagram of a plug-in apparatus at a certain viewing angle according to the present disclosure.
Figure 2:
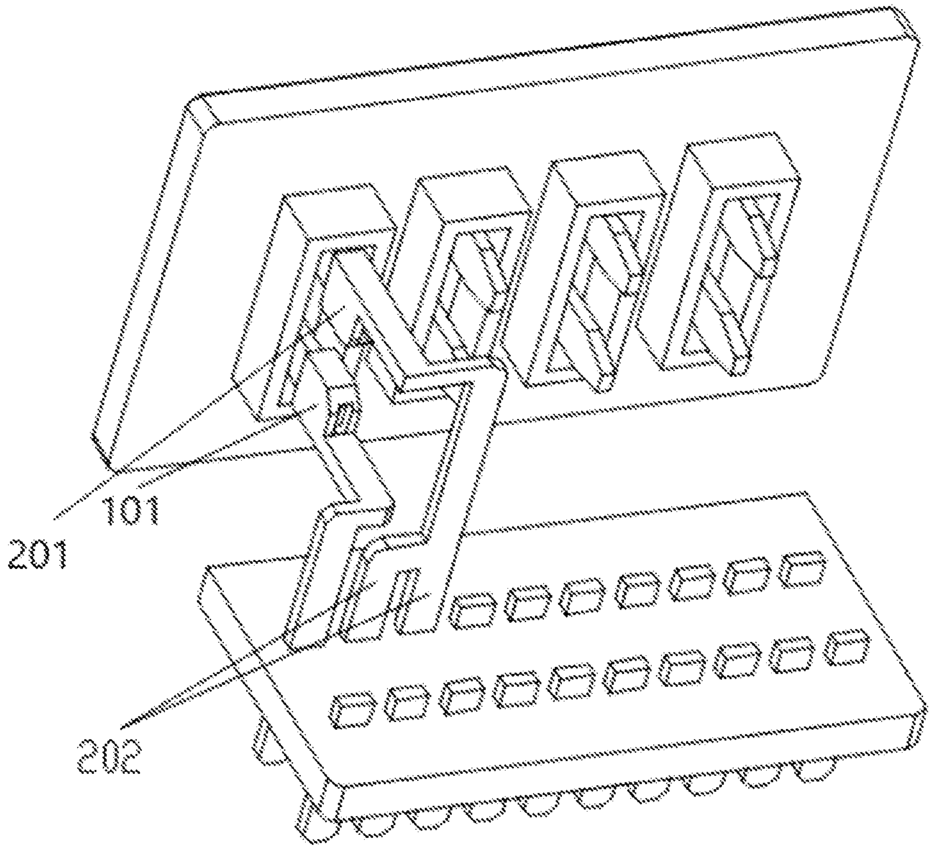
FIG. 2 illustrates a partial structure schematic diagram of a plug-in apparatus in another viewing angle according to the present disclosure.
Figure 3:
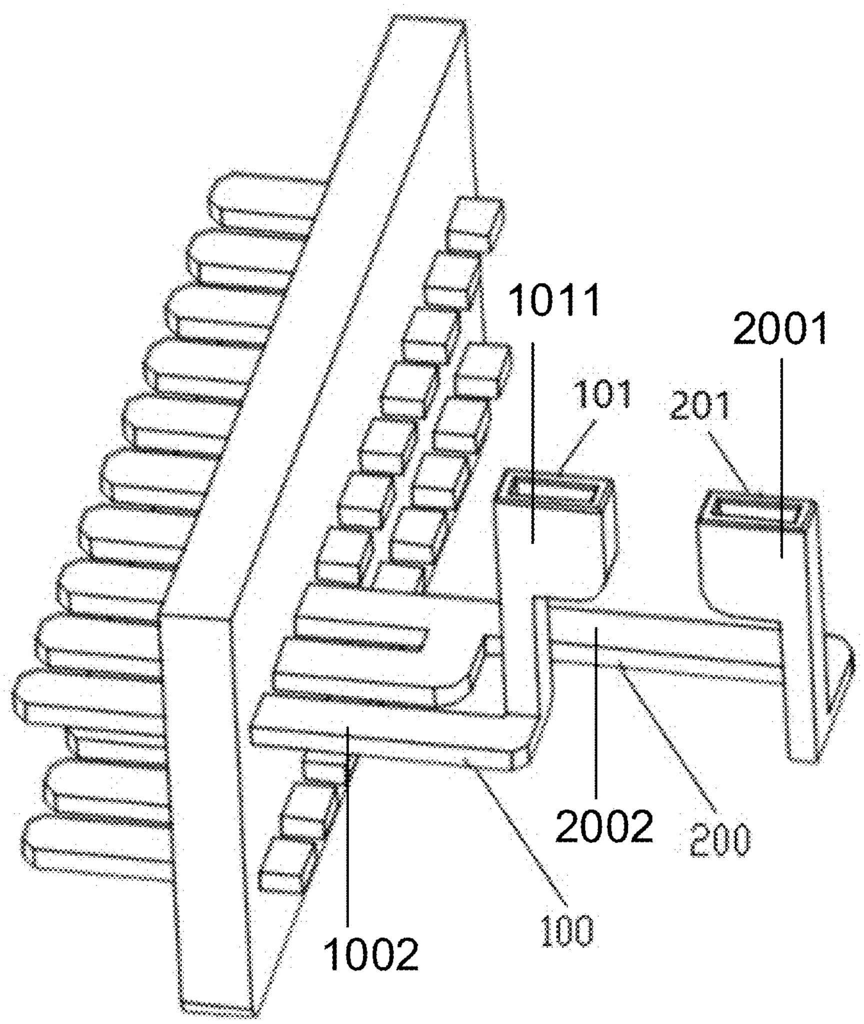
FIG. 3 illustrates a structure schematic diagram of a connection branch of a plug-in apparatus according to the present disclosure.

100: wire inlet connection portion;
200: wire outlet connection portion;
300: fuse;
400: power supply wire;
500: load wire;
600: connection terminal;
700: plug-in portion;
800: positioning plate;
900: housing;
101: first connector;
201: second connector;
202: connection branch;
701: plug-in through-hole;
901: plug-in-plate board;
902: positioning hanger;
903: first sealing member;
904: second sealing member;
905: cover.

DETAILED DESCRIPTION

The embodiments of the present disclosure will be further described below in detail with reference to the drawings and the embodiments. The following detailed description of the embodiments and the drawings are used to exemplify the principles of present disclosure and are not intended to limit the scope of present disclosure, i.e., the present disclosure is not limited to the described embodiments.

In the description of the present disclosure, it should be noted that unless otherwise specified, the terms 'first' and 'second' are only used for descriptive purposes and cannot be construed as indicating or implying a relative importance; 'a plurality of' means two or more; The orientations or positional relationships indicated by the terms 'inner', 'outer', 'top' and 'bottom' are based on those illustrated in the drawings only for the convenience of describing the present disclosure and simplifying the description, and are not intended to indicate or imply that the devices or elements referred to must have a particular orientation, or be constructed and operated in a particular orientation, and therefore should not be construed as limitations to the present disclosure.

Please refer to FIGS. 1 to 4. A plug-in apparatus according to and embodiment of the present disclosure includes an wire inlet connection portion 100 and a wire outlet connection portion 200, a fuse 300 is connected between a first end 1001 of the wire inlet connection portion 100 and a first end 2001 of the wire outlet connection portion 200, a second end 1002 of the wire inlet connection portion 100 is connected to a power supply wire 400, and a second end 2002 of the wire outlet connection portion 200 is connected to a load wire 500; and the second end 2002 of the wire outlet connection portion 200 has at least one connection branch 202, each of which is used as a load interface, and a load may be connected to the connection branch 202 through the load wire 500. In this embodiment, the fuse 300 is connected between the wire inlet connection portion 100 and the wire outlet connection portion 200, the power supply wire 400 is connected to the wire inlet connection portion 100, and the load is connected to the connection branch 202 of the wire outlet connection portion 200 through the load wire 500, so as to realize the power supply to the load; the plurality of connection branches 202 shunt current to supply power to a plurality of loads, so that a wire diameter of the load wire 500 can be reduced; the fuse 300 protects the load wire 500 connected to the connection branch 202, so that a protected wire diameter reduction is realized and the safety is guaranteed; further, a plurality of loads share one fuse, which saves the number of the fuses 300 and increases the convenience of wiring.

The wire diameter of a wire is usually proportional to the rated current, i.e., as the wire diameter increases, the rated current increases, and the carried current increases. In actual configurations, the required specification of the fuse 300 is calculated based on the specification of the load to select an appropriate fuse 300, and then the load wire 500 with an appropriate wire diameter is matched based on the selected fuse 300, so that the load, the fuse 300 and the load wire 500 are matched with each other, thereby preventing the waste caused by using the load wire 500 with a large wire diameter for small current, and avoiding the fact that the wire diameter of the load wire 500 is too small such that the load wire 500 is overheated and cut while the fuse 300 does not respond, so as to eliminate potential safety hazards. Of course, a wire diameter of the wire outlet connection portion 200 is also determined, and a wire diameter of the wire inlet connection portion 100 is designed according to the magnitude of the current inlet. The wire outlet connection portion 200 may be made of one or more materials such as copper, aluminum, magnesium and beryllium, or other conventional metals or alloys, and may be fabricated into a sheet or column shape, may be extendable along a straight line or represent a right-angle shape, and bifurcate into a plurality of parallel connection branches 202 at the second end. The wire inlet connection portion 100 may also be made of one or more materials such as copper, aluminum, magnesium and beryllium, or other conventional metals or alloys. The shape of the wire inlet connection portion 100 is similar to that of the wire outlet connection portion 200 except for the bifurcation at the second end. The design principle is to facilitate the connection of wires, including the power supply wire 400 and the load wire 500, and to facilitate the connection of the fuse 300.

When there are two or more connection branches 202 connected to the load wires 500, the fuse 300 is adapted to a load with the smallest rated current among the loads to which the load wire 500 is connected. The required specification of the fuse 300 is calculated by the rated current of the load to which the load wire 500 is to be connected. When there are a plurality of connection branches 202, i.e., a plurality of loads are to be connected, the fuse is matched according to the load with the smallest rated current among the loads to be connected, i.e., the calculated minimum specification of the fuse 300 is taken as the actually selected specification of the fuse 300, and then the load wire 500 with an appropriate wire diameter is matched based on the specification of the fuse 300, thereby protecting the load wire 500 with the smallest wire diameter, and then protecting all of the load wires 500. The calculation method and the matching method are the prior arts, which will not be repeated here.

When there is only one connection branch 202, under the protection of the fuse 300, the wire diameter of the load wire 500 can be smaller than that of the power supply wire 400, thereby achieving the purpose of wire diameter reduction.

As an optional embodiment, the plug-in apparatus further includes at least one connection terminal 600, which is connected to the second end 1002 of the wire inlet connection portion 100 and at least one connection branch 202. The connection terminal 600 is connected to an external wire, such as the power supply wire 400 or the load wire 500. The wire diameter of the connection terminal 600 connected to the connection branch 202, i.e., the connection terminal 600 downstream of the fuse 300, is determined by the specification of the fuse 300, and for the detail, please refer to the way of determining the wire diameter of the load wire 500. The wire diameter of the connection terminal 600 connected to the wire inlet connection portion 100, i.e., the connection terminal 600 upstream of the fuse 300, is determined by the current inlet. The connection terminal 600 may be designed as a universal type according to the upstream and downstream conditions, which is convenient for actual wiring and improves the flexibility of use. The number of the connection terminals 600 may be the same as a sum of the number of the wire inlet connection portions 100 and a total number of the connection branches 202, or it may be greater than the sum for backup for other connection wirings. The connection terminal 600 may be made of one or more materials of copper, aluminum and magnesium, or other conventional metals or alloys.

As an optional embodiment, the plug-in apparatus further includes a plug-in portion 700 provided with at least one plug-in through-hole 701 penetrating from a first end to a second end thereof, one end of the connection terminal 600 is connected to the second end 1002 of the wire inlet connection portion 100 or the connection branch 202, the other end of the connection terminal 600 extends into the plug-in through-hole 701 from one end of the plug-in through-hole 701, and the other end of the plug-in through-hole 701 is connected to an external wire, specifically for fixing the power supply wire 400 or the load wire 500, so that the power supply wire 400 is connected to the second end 1002 of the wire inlet connection portion 100 and the load wire 500 is connected to the connection branch 202. The connection between the connection terminal 600 and the second 1002 end of the wire inlet connection portion 100 and the connection between the connection terminal 600 and the connection branch 202 may be both achieved by welding, and the connection between a crimped terminal wire and the power supply wire 400 or the load wire 500 may be achieved by crimping. Taking the connection with the load wire 500 as an example, the load wire 500 extends into the plug-in through-hole 701, and the connection terminal 600 crimps the load wire 500 in the plug-in through-hole 701 to realize the connection, which can reduce the external welding spots and increase the convenience of wiring compared with welding. All of the connection terminals 600 may be disposed in parallel with each other, and correspondingly, all of the plug-in through-holes 701 are also disposed in parallel with each other, with the distribution as the connection terminals 600. The connection terminals 600 are plugged into the plug-in through-holes 701 in a one-to-one correspondence.

Regarding the specific arrangement of the connection terminals 600, the following two forms are taken as examples:

1. A plurality of connection terminals 600 are arranged in rows through a positioning plate 800, and each of the connection terminals 600 penetrates the positioning plate 800 so that two ends of the connection terminal 600 are located at two sides of the positioning plate 800, respectively; the wire inlet connection portion 100 and the wire outlet connection portion 200 are both located at a first side of the positioning plate 800, and one end of the connection terminal 600 located at the first side of the positioning plate 800 is connected to the wire inlet connection portion 100 or the wire outlet connection portion 200; the plug-in portion 700 is located at a second side of the positioning plate 800, and one end of the connection terminal 600 located at the second side of the positioning plate 800 extends into the plug-in through-hole 701, which may be understood as that the connection terminal 600 is disposed as being perpendicular to the positioning plate 800, and the connection terminal 600 may be cylindrical, and the positioning plate 800 serves as a positioning structure between the plurality of connection terminals 600 so that the plurality of positioning connection terminals are arranged in rows as needed, and also as a connecting structure between the plurality of connection terminals 600 as a whole and other element, e.g., the plurality of connection terminals 600 are disposed in a housing 900 through the positioning plate 800.
2. A plurality of connection terminals 600 are arranged in rows through a positioning plate 800, and the connection terminals 600 are laid flat on a side of the positioning plate 800 from a first end to a second end thereof; the wire inlet connection portion 100 and the wire outlet connection portion 200 are close to the first end of the positioning plate 800, and one end of the connection terminal 600 close to the first end of the positioning plate 800 is connected to the wire inlet connection portion 100 or the wire outlet connection portion 200; the plug-in portion 700 is close to the second end of the positioning plate 800, and one end of the connection terminal 600 close to a second side of the positioning plate 800 extends into the plug-in through-hole 701, which may be understood as that the connection terminals 600 are arranged in parallel on one or both sides of the positioning plate 800. At this time, the connection terminals 600 and the positioning plate 800 may be fabricated into a PCB as a whole, the connection terminals 600 are correspondingly a sheet shape, and the positioning plate 800 has the functions of positioning between the connection terminals 600 and the connection with other elements; meanwhile, the positioning plate 800 may be additionally provided with other elements to have the common functions of the PCB, optionally to serve for wiring, or to be designed according to specific requirements. The connection terminals 600 in a same row may be arranged at equal intervals, and the intervals between the connection terminals 600 in different rows may be the same, so that the connection terminals 600 in different rows can be arranged in one-to-one alignment to facilitate the wiring. During implementation, different connection terminals 600 may be marked with different colors correspondingly, so as to be distinguished as power terminals or load terminals during wiring.

Figure 5:
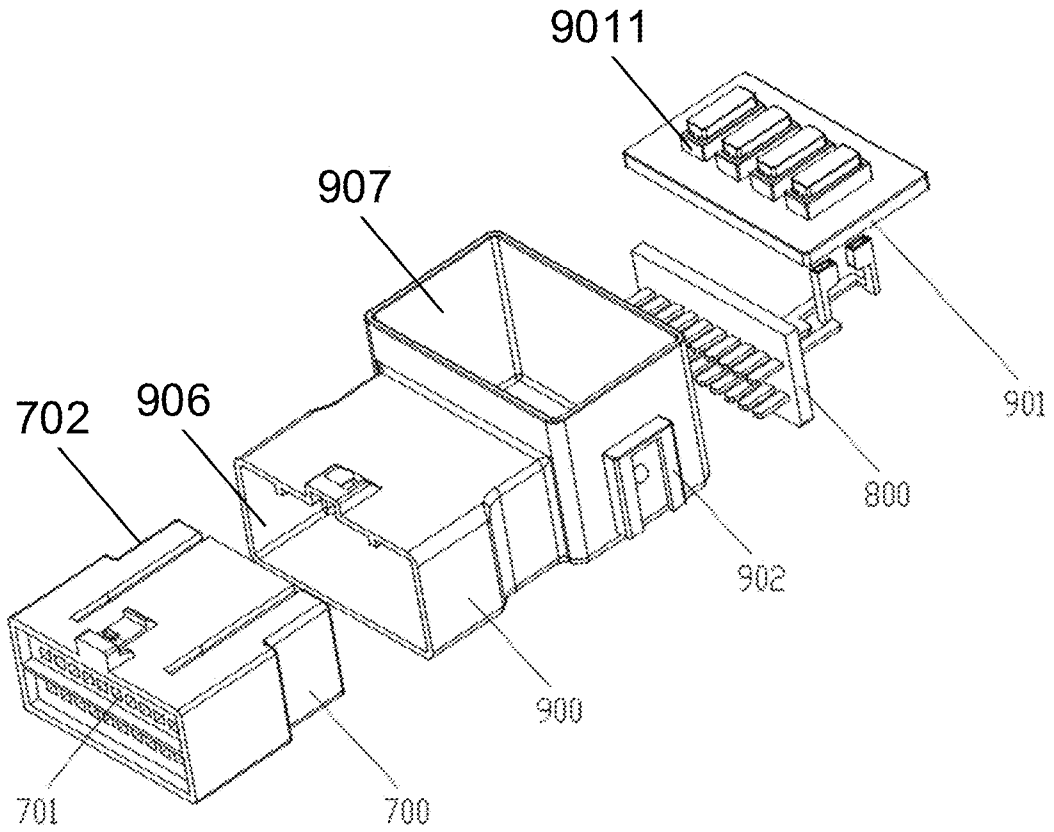
FIG. 5 illustrates an explosion structure schematic diagram of a plug-in apparatus according to the present disclosure.

Referring to FIG. 5, as an optional embodiment, the positioning plate 800, the wire inlet connection portion 100 and the wire outlet connection portion 200 are all disposed in the housing 900, the plug-in portion 700 is detachably connected to the housing 900 from one side 908 of the housing 900, and the first end 702 of the plug-in portion 700 is located in the housing 900. The positioning plate 800 is disposed in the housing 900, so that all of the connection terminals 600 are located in the housing 900, and the positioning plate 800 is configured to snap in the housing 900. The first end 702 of the plug-in portion 700 is plugged into the housing 900 from one side 908 of the housing 900 to realize a detachable connection, which specifically may be a snap connection.

In addition, sockets 9011 are provided on a top 909 of the housing 900 at positions corresponding to the first end 1001 of the wire inlet connection portion 100 and the first end 2001 of the wire outlet connection portion 200, and the sockets 9011 are configured to fix the fuse 300. Meanwhile, the first end 1001 of the wire inlet connection portion 100 is provided with a first connector 101, the first end 2001 of the wire outlet connection portion 200 is provided with a second connector 201, and the first connector 101 and the second connector 201 are connected to the fuses 300. Each of the first connector 101, the second connector 201 and the connection branch 202 may be made of one or more materials of copper, aluminum, magnesium and beryllium, or other conventional metals or alloys.

In this embodiment, the socket 9011 is located at the top 909 of the housing 900, and the fuse 300 is connected to the wire inlet connection portion 100 and the wire outlet connection portion 200 located inside the housing 900 through the socket 9011. Taking the conventional MINI fuse (with the rated current of 10 A, 15 A, 20 A, 25 A, 30 A, etc.), i.e., the illustrated fuse 300 as an example, pins of the fuse 300 extend into the housing 900 through the socket 9011 and are connected to the wire inlet connection portion 100 and the wire outlet connection portion 200. Correspondingly, one end of the wire inlet connection portion 100 is provided with the first connector 101, and one end of the wire outlet connection portion 200 is provided with the second connector 201. The first connector 101 and the second connector 201 may be annular and matched with pins of the fuse 300, to realize the connection with the fuse 300 and facilitate the assembly of the fuse 300. The socket 9011 has a shape matched with that of the fuse 300, and has a function of fixing the fuse 300 after the fuse 300 is connected to the wire inlet connection portion 100 and the wire outlet connection portion 200. The socket 9011 may be formed by removing a material from the top 909 of the housing 900, or integrally formed with the housing 900, or formed on a plug-in board 901, and then the plug-in board 901 is connected to the top 909 of the housing 900. Of course, at this time the top 909 of the housing 900 has an opening for mounting the plug-in board 901, and the plug-in board 901 is detachably connected into the opening.

Figure 6:
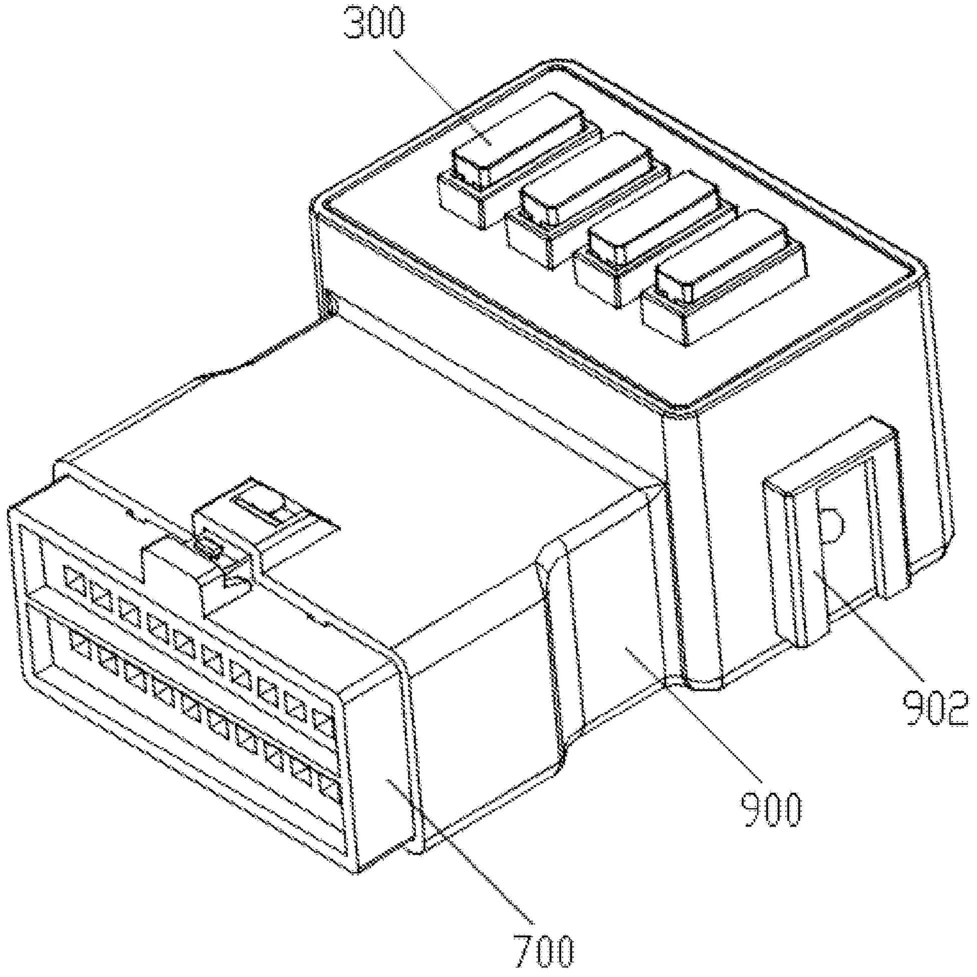
FIG. 6 illustrates an assembly structure schematic diagram of a plug-in apparatus according to the present disclosure.

Referring to FIG. 6, as an optional embodiment, an outer wall of the housing 900 is provided with at least one positioning hanger 902. For example, two positioning hangers 902 are located at two sides of the housing 900, respectively. The housing 900 is connected to other elements, e.g., assembled on the vehicle body, through the positioning hangers 902, and the specific structure is determined by the connected position and elements, which may be a slot structure or any other structural form. Considering the connection stability of the housing 900, both sides of the housing 900 may be provided with the positioning hangers 902, and further, the positioning hangers 902 on both sides of the housing 900 are symmetrically disposed. In conjunction with the above description, the plug-in portion 700 is connected to one end of the housing 900, such as a front end of the housing 900, the fuse 300 is connected from the top 909 of the housing 900, and the positioning hangers 902 are located at left and right sides of the housing 900, so that the whole apparatus is convenient for assembling. The fuse 300 is assembled outside the housing 900 to facilitate the heat dissipation of the fuse 300.

Figure 4:
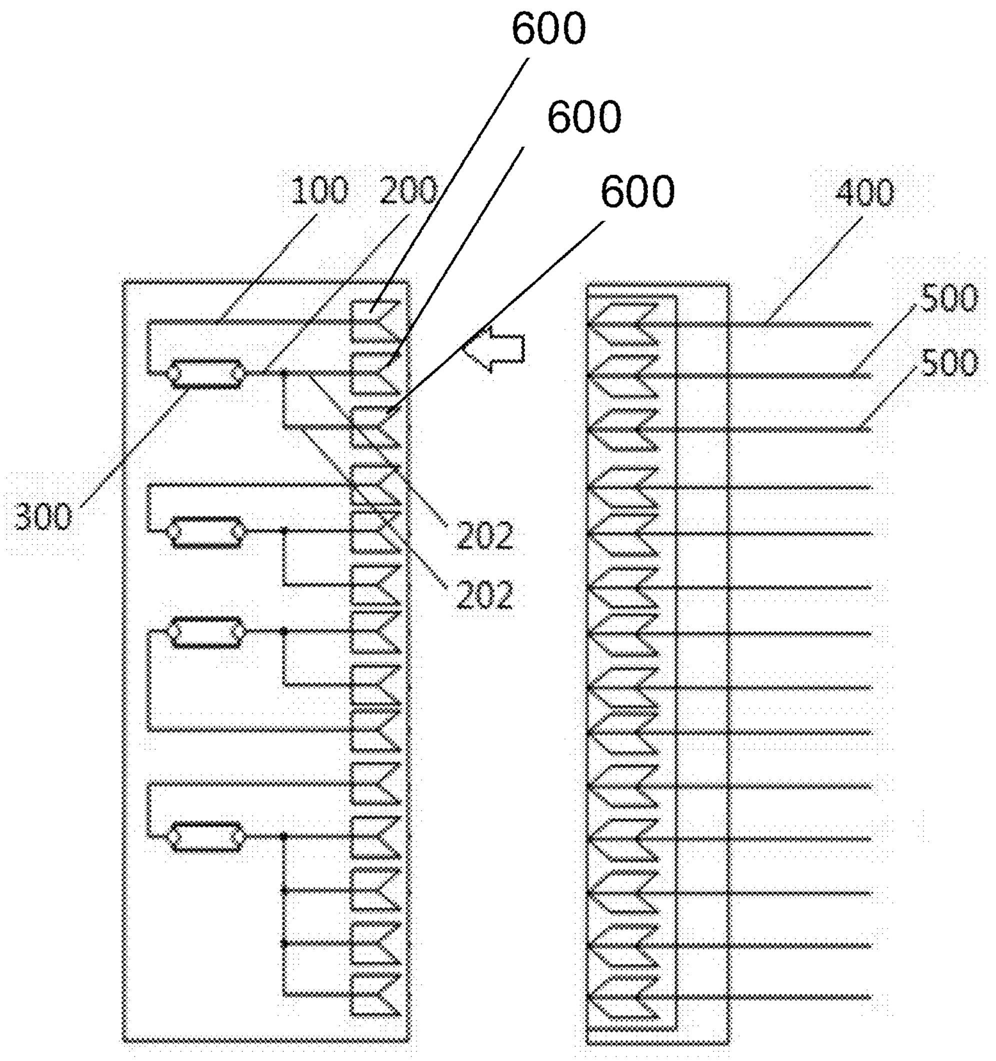
FIG. 4 illustrates an electrical schematic diagram of a plug-in apparatus according to the present disclosure.

As an optional embodiment, the wire inlet connection portion 100 and the wire outlet connection portion 200 are disposed in at least one pair, and the position between the wire inlet connection portions 100 and the wire outlet connection portions 200 of each pair is connected to the fuse 300. Each pair of the wire inlet connection portions 100 and the wire outlet connection portions 200 may be called as a wiring module, and a plurality of wiring modules are located in the housing 900. Loads of the same type may be connected to one wiring module, e.g., a plurality of lamps are connected to one wiring module, a plurality of horns are connected to one wiring module, etc. Loads of similar specifications may also be connected to one wiring module, e.g., lamps and horns with the rated current of 10 A are all connected to one wiring module, so that the fuse 300 matched with a single wiring module is more suitable, thereby achieving a protective function without causing waste. The number of the wiring modules and the number of shunt circuits of each wiring module may be determined according to the specific type, specification and number of the loads in conjunction with the electrical principle requirements of the whole vehicle, so as to flexibly set the on-load form, as illustrated in FIG. 4, which may be four-way on-load, i.e., four-way fuses, thereby greatly expanding the capacity of a central power distribution box. The intervals between the adjacent wiring modules may be the same, and equal intervals between the connectors of the adjacent wiring modules enables equal intervals between the matched fuses 300, and the sockets 9011 on the plug-in board 901 are equally spaced, so that the structure is regular and the use is convenient. Each of the plug-in portion 700, the positioning plate 800, the housing 900 and the plug-in board 901 is made of an insulating material, such as one or more of as amide, polycarbonate, polyvinyl chloride, polyurethane, polysulfone, polytetrafluoroethylene, polyethylene, polypropylene, polyphenylene ether, polyester, plastic (PPS, DAP, PBT, ABS), phenolic resin, urea formaldehyde, nylon, rubber (TPE, PFE, TPR, EVA), foam (XPE), crosslinked polyethylene (XLPE), ethylene tetrafluoroethylene (ETFE), perfluoroalkoxy alkane, styrene-acrylonitrile copolymer, polymethacrylate, polyphenylene sulfide, polystyrene, polyoxymethylene resin.

As a further solution, at least part of surfaces of the wire inlet connection portion and the wire outlet connection portion are provided with plating layers. Since the surfaces of the wire inlet connection portion and the wire outlet connection portion may be exposed to air and water, and even the air in some places contains salt, those surfaces will be subject to oxidation and salt mist corrosion, thereby damaging the service life of the apparatus. Therefore, the surfaces of the wire inlet connection portion and the wire outlet connection portion are provided with plating layers, which can effectively prevent the corrosion of air, water and salt mist, prolong the service life of the apparatus and reduce the occurrence of safety accidents.

A material of the plating layer may be one or alloy or combinations of nickel, cadmium, zirconium, chromium, cobalt, manganese, aluminum, tin, titanium, zinc, copper, silver, gold, graphene and carbon-based compound. In order to demonstrate the influences of the plating layers of different materials on the service life of the plug-in apparatus, the service life of the plug-in apparatus under the salt mist spraying condition is investigated, and the results are shown below in Table 1:

TABLE 1

| Material of the plating layer | | | | | | | | | | | | | | | |
|---|---|---|---|---|---|---|---|---|---|---|---|---|---|---|---|
| No plating layer | Nickel | Cadmium | Zirconium | Chromium | Cobalt | Manganese | Aluminum | Tin | Titanium | Zinc | Copper | Silver | Gold | Graphene | Carbon-nano |
| Service life of the plug-in apparatus under the salt mist spraying condition (H) | | | | | | | | | | | | | | | |
| 1936 | 3756 | 3762 | 3698 | 3526 | 3463 | 3777 | 3454 | 3567 | 3845 | 3589 | 3752 | 3869 | 3956 | 3924 | 4257 |

As can be seen from Table 1, under the salt mist spraying condition, the service life of a plug-in apparatus without plating layer cannot meet the basic condition of more than 3,000H, while other plug-in apparatuses with plating layers meet the requirement of the service life of more than 3,000H.

Further, a thickness of a plating layer in an area for connecting the fuse on each of the wire inlet connection portion and the wire outlet connection portion is greater than or equal to that of a plating layer outside the area, so as to particularly protect the area for connecting the fuse.

The conductive property (conductivity) of the plating layer in the area for connecting the fuse on each of the wire inlet connection portion and the wire outlet connection portion is better than that of the plating layer outside the area. For example, silver is plated in the area for connecting the fuse, and tin is plated in other areas. For another example, gold is plated in the area for connecting the fuse, and zinc is plated in other areas. The advantage is that the contact resistance between the wire inlet connection portion or the wire outlet connection portion and the fuse can be further reduced, thereby increasing the service life of the plug-in apparatus (for example, as shown below in Table 2). Meanwhile, the cost is saved, and the use range of the plug-in apparatus is extended.

TABLE 2

| Setting mode | Plug-in apparatus in which the conductive property conductivity) of the plating layer in the area for connecting the fuse on each of the wire inlet connection portion and the wire outlet connection portion is better than that of the plating layer outside the area | Plug-in apparatus in which the conductive property (conductivity) of the plating layer in the area for connecting the fuse on each of the wire inlet connection portion and the wire outlet connection portion is euqal to that of the plating layer outside the area |
|---|---|---|
| Average service life (H) | 100000 | 78000 |

As can be seen from Table 2, compared with the plug-in apparatus in which the conductive property of the plating layer in the area for connecting the fuse is equal to that of the plating layer outside the area, the plug-in apparatus in which the conductive property of the plating layer in the area for connecting the fuse is better than that of the plating layer outside the area has a longer service life.

As a further solution, the thickness of the surface plating layer of each of the wire inlet connection portion and the wire outlet connection portion is 0.09 to 1,500 μm. In order to demonstrate the influence of thickness of the plating layer on the service life of the plug-in apparatus, a nickel plating layer is adopted to investigate the service life of the plug-in apparatus under the salt mist spraying condition, and the results are shown below in Table 3;

TABLE 3

| Plating layers with different thicknesses (μm) | | | | | | | | |
|---|---|---|---|---|---|---|---|---|
| 0.001 | 0.003 | 0.006 | 0.009 | 0.01 | 0.03 | 0.03 | 0.03 | 0.1 |
| Service life of the plug-in apparatus under the salt mist spraying condition (H) | | | | | | | | |
| 2036 | 2124 | 2264 | 2326 | 2474 | 2684 | 2841 | 3284 | 3342 |
| Contact voltage drop (mv) | | | | | | | | |
| 0.1 | 0.3 | 0.3 | 0.3 | 0.1 | 0.3 | 0.3 | 0.3 | 0.1 |
| Electrical failure rate of the whole vehicle (0.01%) | | | | | | | | |
| 0.1 | 0.3 | 0.3 | 0.3 | 0.1 | 0.3 | 0.3 | 0.3 | 0.1 |
| Plating layers with different thicknesses (μm) | | | | | | | | |
| 5 | 40 | 40 | 40 | 100 | 100 | 400 | 400 | 100 |

TABLE 3-continued

| | | | | | | | | |
|---|---|---|---|---|---|---|---|---|
| Service life of the plug-in apparatus under the salt mist spraying condition (H) | | | | | | | | |
| 3641 | 3587 | 3516 | 3486 | 3422 | 3587 | 3495 | 3427 | 3368 |
| Contact voltage drop (mv) | | | | | | | | |
| 39 | 37 | 37 | 37 | 39 | 37 | 37 | 37 | 19 |
| Electrical failure rate of the whole vehicle (0.01%) | | | | | | | | |
| 1.3 | 1 | 1 | 0.3 | 1.3 | 1 | 0.8 | 0.7 | 0.8 |
| Plating layers with different thicknesses (μm) | | | | | | | | |
| 0.3 | 0.6 | 0.3 | 1 | 1.3 | 1 | 1 | 5 | 10 |
| Service life of the plug-in apparatus under the salt mist spraying condition (H) | | | | | | | | |
| 2326 | 3422 | 3468 | 3527 | 3549 | 3642 | 3676 | 3706 | 3728 |
| Contact voltage drop (mv) | | | | | | | | |
| 0.3 | 0.1 | 53 | 53 | 50 | 48 | 48 | 43 | 40 |
| Electrical failure rate of the whole vehicle (0.01%) | | | | | | | | |
| 0.3 | 0.1 | 19 | 19 | 16 | 19 | 1 | 5 | 8 |
| Plating layers with different thicknesses (μm) | | | | | | | | |
| 1000 | 1100 | 1000 | 1000 | 1100 | 1000 | 1000 | 1100 | 1800 |
| Service life of the plug-in apparatus under the salt mist spraying condition (H) | | | | | | | | |
| 3342 | 3422 | 3587 | 3495 | 3276 | 3259 | 2913 | 2754 | 2655 |
| Contact voltage drop (mv) | | | | | | | | |
| 23 | 20 | 23 | 23 | 31 | 23 | 37 | 39 | — |
| Electrical failure rate of the whole vehicle (0.01%) | | | | | | | | |
| 1 | 5 | 1 | 2.5 | 2.2 | 2.4 | 0.3 | 0.1 | 10 |

As can be seen from Table 3, when the thickness of the plating layer is less than 0.09 μm, the service life of the plug-in apparatus cannot meet the basic condition of more than 3,000 H. When the thickness of the plating layer is greater than 1,500 μm, the service life of the plug-in apparatus still cannot meet the basic condition of more than 3,000 H, and in order to obtain the plating layer with the thickness greater than 1,500 μm, the material consumption and the processing time increase greatly. Therefore, the thickness of the surface plating layer of each of the wire inlet connection portion and the wire outlet connection portion is selected to be 0.09 to 1,500 μm. Within the thickness range of the plating layer, the contact voltage drop and the electrical failure rate of the whole vehicle meet the requirements of use.

Figure 8:
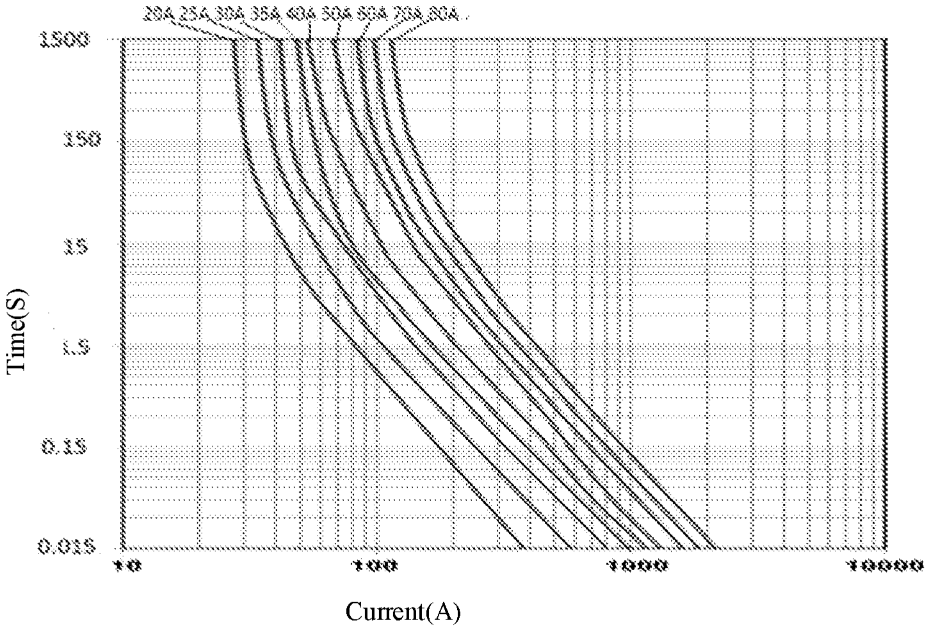
FIGS. 8 to 11 illustrate fusing time characteristic curves of fuses with different rated currents under different fusing currents in a plug-in apparatus according to the present disclosure.
Figure 9:
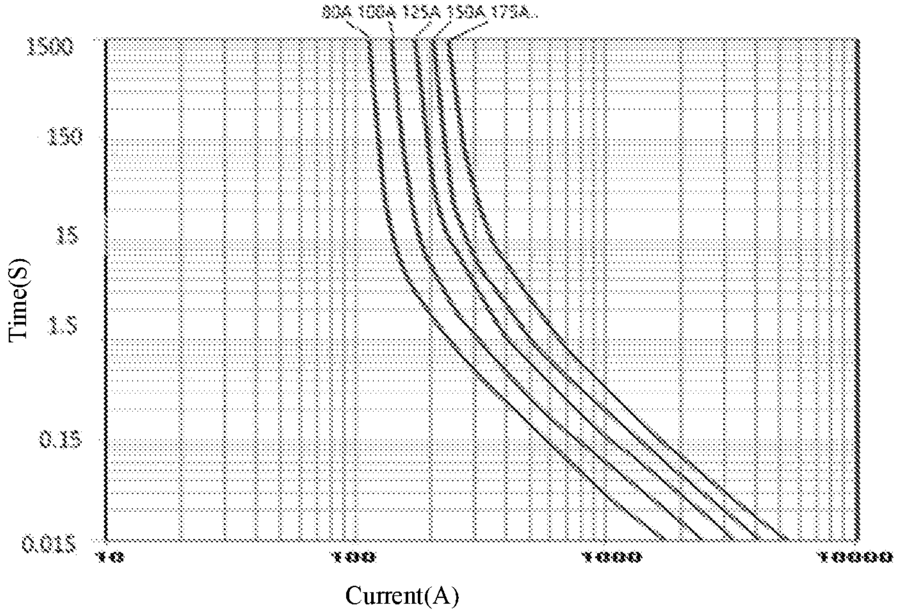
Figure 10:
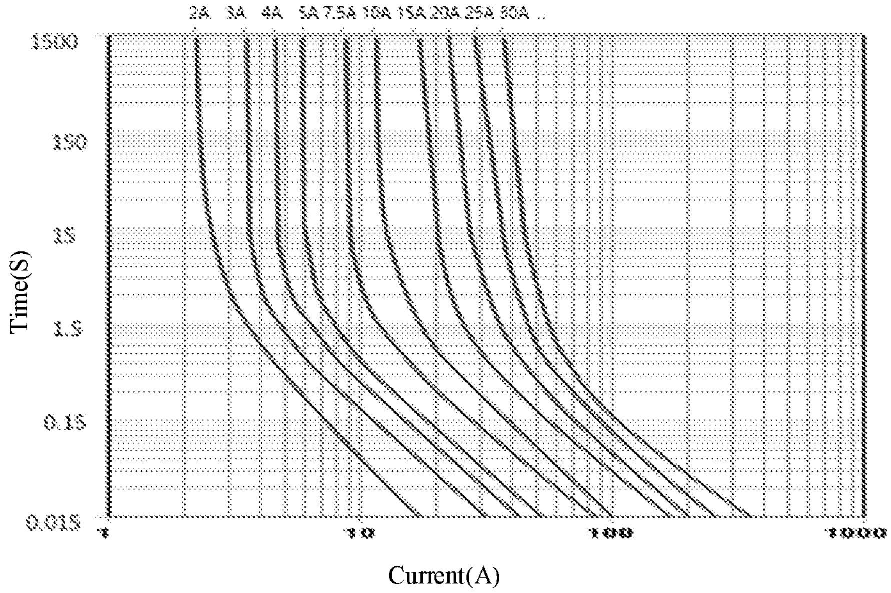
Figure 11:
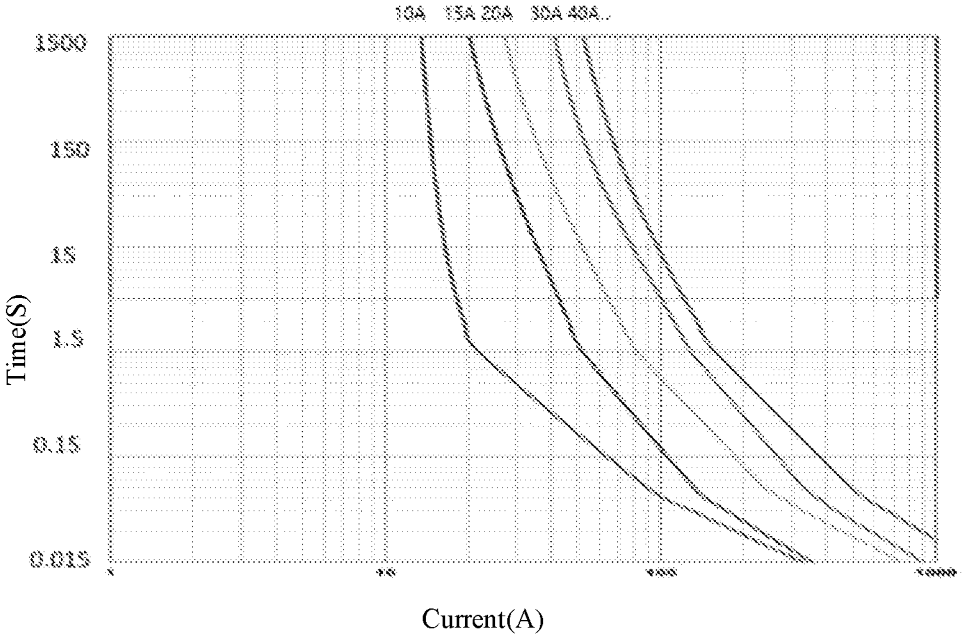

As a further solution, the fuse may be one or more of a hot-melt fuse, a thermistor fuse, a Positive Temperature Coefficient (PTC) resistor fuse, a memory alloy fuse, a thermal trigger electronic fuse (in the form of sensor, controller or power tube) and a current trigger electronic fuse (in the form of sensor, controller or power tube). For the fusing time of the fuses with different rated currents under different fusing currents, please refer to the following drawings:

FIG. 8 illustrates a characteristic graph for fusing current (A) and fusing time (S) when the fuse is a thermistor fuse, and curves in the graph show the fusing time of the thermistor fuses with different rated currents under different fusing currents;

FIG. 9 illustrates a characteristic graph for fusing current (A) and fusing time (S) when the fuse is a PTC fuse, and curves in the graph show the fusing time of the PTC fuses with different rated currents under different fusing currents;

FIG. 10 illustrates a characteristic graph for fusing current (A) and fusing time (S) when the fuse is a hot-melt fuse, and curves in the graph show the fusing time of the hot-melt fuses with different rated currents under different fusing currents;

FIG. 11 illustrates a characteristic graph for fusing current (A) and fusing time (S) when the fuse is a memory alloy fuse, and curves in the graph show the fusing time of the memory alloy fuses with different rated currents under different fusing currents.

Further, the rated current of the fuse covers 0.5 to 3,000 A, and the cross-sectional area may be selected as 0.1 to 30 $mm^2$.

A current carrying capacity of the power supply wire connected to the second end 1002 of the wire inlet connection portion is greater than or equal to that of the load wire connected to the second end 2002 of the wire outlet connection portion, which is beneficial to achieve the purpose of wire diameter reduction and current-shunting of the wire. For example, the wire diameter of the power supply wire may be 0.35 to 50 $mm^2$, and the wire diameter of the load wire may be 0.13 to 35 $mm^2$.

Figure 7:
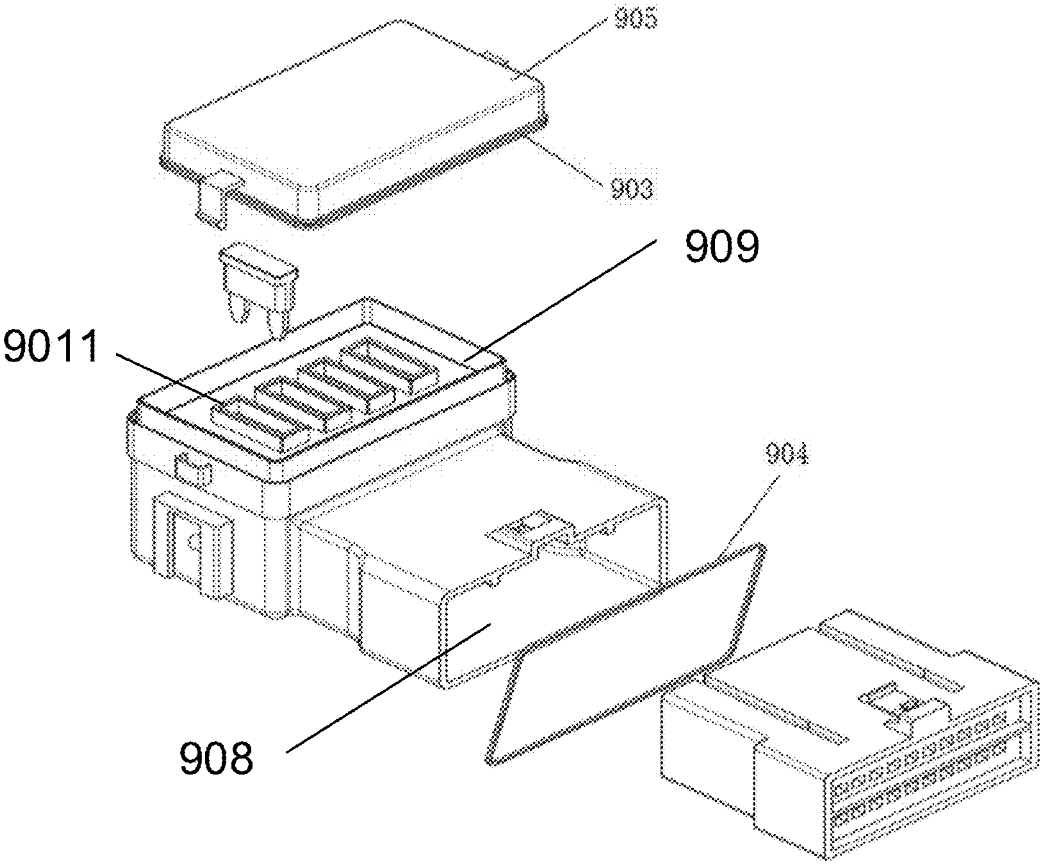
FIG. 7 illustrates an assembly position schematic diagram of a first sealing member and a second sealing member of a plug-in apparatus according to the present disclosure.

Referring to FIG. 7, as a further solution, the socket 9011 is connected to a cover 905, and at least one first sealing member 903 sleeves on the cover, and the sealing member 903 is located between the cover 905 and the housing 900; a second sealing member 904 sleeves on the first end 702 of the plug-in portion 700, and the second sealing member 904 is located between the plug-in portion 700 and the housing 900. By disposing the first sealing member 903 and the second sealing member 904, the sealing performance of the whole apparatus is improved, so that the plug-in apparatus is suitable to the humid environment. The cover 905 may be detachably or integrally connected to the socket 9011. For example, after being connected to the socket 9011, the cover 905 is fixed by an injection process, so that the cover 905 and the housing 900 are integrally formed. An extension direction of the connection branch 202 and an extension direction of the second end 1002 of the wire inlet connection portion 100 are parallel to the plug-in board 901, an extension direction of the first end of the wire inlet connection portions and an extension direction the first end 2001 of the wire outlet connection portion 200 are perpendicular to the plug-in board. The housing 900 is provided with a first accommodating cavity 906 penetrating the one side 908 of the housing 900 along a first direction, and a second accommodating cavity 907 penetrating the top of the housing 900 along a second direction. the first direction is perpendicular to the second direction; and the plug-in portion 700 is inserted into the first accommodating cavity 906, the positioning plate 800, the wire inlet connection portion and the wire outlet connection portion are all disposed in the second accommodating cavity 907 of the housing 900, and the plug-in portion 700 is arranged on the top of the housing 900. The connection terminal 600 and the plug-in through-hole 701 are arranged along the first direction, the first end of the wire inlet connection portion 100, the first end 2001 of the wire outlet connection portion 200, and the socket 9011 are arranged along the second direction.

It should be understood by those skilled in the art that those described above are only specific embodiments of the present disclosure, and the protection scope of the present disclosure is not limited thereto. Obviously, various modifications and variations can be made to the present disclosure by those skilled in the art without departing from the spirit and scope of the present disclosure. Thus, if these modifications and variations to the present disclosure fall within the scope of the claims of the present disclosure and their technical equivalents, the present disclosure is intended to include these modifications and variations.

The invention claimed is:

1. A plug-in apparatus, comprising a wire inlet connection portion and a wire outlet connection portion, wherein:

a fuse is connected between a first end of the wire inlet connection portion and a first end of the wire outlet connection portion, a second end of the wire inlet connection portion is connected to a power supply wire, and a second end of the wire outlet connection portion is connected to a load wire;

the second end of the wire outlet connection portion has at least one connection branch which serves as a load interface;

the plug-in apparatus further comprises at least one connection terminal, to which the second end of the wire inlet connection portion and/or the at least one connection branch is connected, and the connection terminal is connected to the power supply wire or the load wire;

the plug-in apparatus further comprises a positioning plate, on which the at least one connection terminal is disposed to penetrate therethrough;

the plug-in apparatus further comprises a plug-in portion provided with at least one plug-in through-hole penetrating from a first end to a second end thereof; one end of the connection terminal is connected to the second end of the wire inlet connection portion or the connection branch, the other end of the connection terminal extends into the plug-in through-hole from one end of the plug-in through-hole, and the other end of the plug-in through-hole is connected to the power supply wire or the load wire, wherein the plurality of connection terminals are plugged into the plurality of plug-in through-holes in a one-to-one correspondence, the load wire or the power supply wire extends into the plug-in through-hole, and the connection terminal crimps the load wire or the power supply wire in the plug-in through-hole to realize the connection between the connection terminal and the load wire or the power supply wire; and the plug-in apparatus further comprises a housing, in which the positioning plate, the wire inlet connection portion and the wire outlet connection portion are disposed, and the plug-in portion is detachably connected to the housing from one side of the housing, and a first end of the plug-in portion is located in the housing.

2. The plug-in apparatus according to claim 1, wherein:

two ends of the connection terminal are located at two sides of the positioning plate, respectively;

the wire inlet connection portion and the wire outlet connection portion are both located at a first side of the positioning plate, and one end of the connection terminal located at the first side of the positioning plate is connected to the wire inlet connection portion or the wire outlet connection portion; and the plug-in portion is located at a second side of the positioning plate, and one end of the connection terminal located at the second side of the positioning plate extends into the plug-in through-hole.

3. The plug-in apparatus according to claim 1, wherein:

the connection terminal is laid flat on a side of the positioning plate from a first end to a second end thereof;

the wire inlet connection portion and the wire outlet connection portion are close to the first end of the positioning plate, and one end of the connection terminal close to the first end of the positioning plate is connected to the wire inlet connection portion or the wire outlet connection portion; and the plug-in portion is close to the second end of the positioning plate, and one end of the connection terminal close to a second side of the positioning plate extends into the plug-in through-hole.

4. The plug-in apparatus according to claim 1, wherein the plug-in apparatus further comprises a plug-in board, on which a plurality of sockets are provided, and the plug-in board is connected to a top of the housing, and wherein the top of the housing has an opening for mounting the plug-in board, and the plug-in board is detachably connected into the opening, and the fuse is connected to the wire inlet connection portion and the wire outlet connection portion located inside the housing through the socket.

5. The plug-in apparatus according to claim 1, wherein an outer wall of the housing is provided with at least one positioning hanger.

6. The plug-in apparatus according to claim 1, wherein each of the first end of the wire inlet connection portion and the first end of the wire outlet connection portion is provided with a connector which is connected to the fuse.

7. The plug-in apparatus according to claim 1, wherein the wire inlet connection portion and the wire outlet connection portion are disposed in at least one pair, and the position between the wire inlet connection portions and the wire outlet connection portions of each pair is connected to the fuse.

8. The plug-in apparatus according to claim 1, wherein the fuse is one or more of a hot-melt fuse, a thermistor fuse, a positive temperature coefficient resistor fuse, a memory alloy fuse, a thermal trigger electronic fuse and a current trigger electronic fuse.

9. The plug-in apparatus according to claim 1, wherein a current carrying capacity of the power supply wire connected to the second end of the wire inlet connection portion is greater than or equal to that of the load wire connected to the second end of the wire outlet connection portion.

10. The plug-in apparatus according to claim 4, wherein the socket is connected to a cover, at least one sealing member sleeves on the cover, and the sealing member is located between the cover and the housing.

11. The plug-in apparatus according to claim 1, wherein the fuse is matched according to the load with the smallest rated current among the loads to be connected, the calculated minimum specification of the fuse is taken as the actually selected specification of the fuse, and the load wire with an appropriate wire diameter is matched based on the specification of the fuse.

12. The plug-in apparatus according to claim 4, wherein an extension direction of the connection branch and an extension direction of the second end of the wire inlet connection portion are parallel to the plug-in board, an extension direction of the first end of the wire inlet connection portions and an extension direction the first end of the wire outlet connection portion are perpendicular to the plug-in board.

13. The plug-in apparatus according to claim 4, wherein the housing is provided with a first accommodating cavity penetrating the one side of the housing along a first direction, and a second accommodating cavity penetrating the top of the housing along a second direction, the first direction is perpendicular to the second direction; and the plug-in portion is inserted into the first accommodating cavity, the positioning plate, the wire inlet connection portion and the wire outlet connection portion are all disposed in the second accommodating cavity of the housing, and the plug-in portion is arranged on the top of the housing.

14. The plug-in apparatus according to claim 13, wherein the connection terminal and the plug-in through-hole are arranged along the first direction, the first end of the wire inlet connection portion, the first end of the wire outlet connection portion, and the socket are arranged along the second direction.

* * * * *